US012006073B1

United States Patent
Freedman et al.

(10) Patent No.: US 12,006,073 B1
(45) Date of Patent: *Jun. 11, 2024

(54) SPACE PRINTER

(71) Applicant: RKF Engineering Solutions LLC, Bethesda, MD (US)

(72) Inventors: Jeffrey Freedman, Laurel, MD (US);
Ted Kaplan, North Potomac, MD (US);
Phil Rubin, Washington, DC (US);
David Marshack, Bethesda, MD (US);
David Milliner, Potomac, MD (US)

(73) Assignee: RKF Engineering Solutions LLC, Bethesda, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/100,141

(22) Filed: Jan. 23, 2023

Related U.S. Application Data

(63) Continuation of application No. 16/228,343, filed on Dec. 20, 2018, now Pat. No. 11,565,836.

(60) Provisional application No. 62/608,870, filed on Dec. 21, 2017.

(51) Int. Cl.
| | |
|---|---|
| *B64G 1/66* | (2006.01) |
| *B64G 1/16* | (2006.01) |
| *B64G 1/44* | (2006.01) |
| *B64G 4/00* | (2006.01) |
| *G06F 3/12* | (2006.01) |

(52) U.S. Cl.
CPC .............. *B64G 1/66* (2013.01); *B64G 1/16* (2013.01); *B64G 1/443* (2013.01); *G06F 3/1285* (2013.01); *G06F 3/1292* (2013.01); *G06F 3/1294* (2013.01); *B64G 2004/005* (2013.01)

(58) Field of Classification Search
CPC . B64G 1/66; B64G 1/16; B64G 1/443; B64G 2004/005; G06F 3/1285; G06F 3/1292; G06F 3/1294
See application file for complete search history.

(56) References Cited

U.S. PATENT DOCUMENTS

| | | | |
|---|---|---|---|
| 6,471,202 B1 * | 10/2002 | Sugimura | B65H 5/06 271/119 |
| 10,832,015 B2 * | 11/2020 | Hattrup | G06K 19/06037 |
| 11,565,836 B1 | 1/2023 | Freedman et al. | |
| 2005/0005102 A1 * | 1/2005 | Meggitt | G06K 7/1413 713/164 |

(Continued)

FOREIGN PATENT DOCUMENTS

| | | |
|---|---|---|
| CN | 104626581 | 5/2015 |
| DE | 10009619 | 4/2001 |

(Continued)

*Primary Examiner* — Donald J Wallace
*Assistant Examiner* — Jalal C Coduroglu
(74) *Attorney, Agent, or Firm* — Fish & Richardson P.C.

(57) ABSTRACT

An item to write on a surface of a celestial body that has less atmosphere than Earth is received at a communications station and from a user device. An instruction that triggers the robot to write the item on the surface of the celestial body is provided by the communications station and to a robot on the surface of the celestial body. An image of the item written on the surface of the celestial body is received by the communications station and from the robot. The image of the item written on the surface of the celestial body is provided by the communications station and to the user device.

21 Claims, 3 Drawing Sheets

(56) References Cited

U.S. PATENT DOCUMENTS

| | | |
|---|---|---|
| 2006/0209400 A1* | 9/2006 | Wertz .................... G02B 5/08 |
| | | 359/399 |
| 2007/0069030 A1 | 3/2007 | Sauerwein et al. |
| 2007/0109311 A1* | 5/2007 | Suda ..................... G06T 15/04 |
| | | 345/582 |
| 2013/0151912 A1 | 6/2013 | Sevugapandian |
| 2016/0267367 A1* | 9/2016 | Uno ......................... B41J 3/44 |
| 2017/0036783 A1 | 2/2017 | Snyder |
| 2017/0280211 A1 | 9/2017 | Damaghi et al. |
| 2017/0289380 A1* | 10/2017 | Oguchi ................ G06F 3/1285 |
| 2018/0036879 A1* | 2/2018 | Buibas ................. B25J 19/023 |
| 2018/0134476 A1* | 5/2018 | Rosenzweig ........... B32B 27/10 |
| 2018/0281303 A1* | 10/2018 | Yerazunis ............. B29C 64/118 |
| 2018/0297392 A1* | 10/2018 | Caberwal .............. B43L 13/026 |
| 2019/0179511 A1* | 6/2019 | Shimada ................ G06F 3/011 |
| 2019/0317497 A1 | 10/2019 | Mere |
| 2019/0326982 A1 | 10/2019 | Darby, III |
| 2020/0412902 A1* | 12/2020 | Yamada ............. H04N 1/00973 |
| 2021/0115274 A1* | 4/2021 | Weiss .................... C09D 11/38 |

FOREIGN PATENT DOCUMENTS

| | | |
|---|---|---|
| JP | 2005100409 | 4/2005 |
| JP | 3647180 | 5/2005 |
| WO | WO 2017066376 | 4/2017 |
| WO | WO 2018179547 | 10/2018 |

\* cited by examiner

SPACE PRINTER

CROSS-REFERENCE TO RELATED APPLICATIONS

This application is a continuation of U.S. application Ser. No. 16/228,343, filed Dec. 20, 2018, which claims the benefit of U.S. Provisional Application No. 62/608,870, filed Dec. 21, 2017. The disclosure of each of the foregoing applications is incorporated herein by reference.

TECHNICAL FIELD

The following disclosure relates generally to data storage.

BACKGROUND

Information may stored in a variety of ways. For example, information may be written down using pen and paper. In another example, information may be represented as binary values stored on non-transitory computer readable medium.

SUMMARY

The following disclosure describes extraterrestrial information storage. A system may store information through changing a surface of a celestial body that has less atmosphere than Earth. For example, the system may write in dirt on the surface of the Moon. A celestial body that has less atmosphere than Earth may be considered a celestial body with an average surface atmospheric of less than seven hundred, a thousand, ten thousand, or some other amount of pascals. For example, a celestial body that has less atmosphere than Earth may be the Moon or Mars.

Providing information through changing a surface of a celestial body that has less atmosphere than Earth may allow information to be preserved over a very long time, e.g., over thousands to millions of years. On Earth, stored data may degrade over time. For example, weather conditions and precipitants may erode anything written on Earth. However, celestial bodies with no or low atmospheric may not have weather conditions or precipitants that would erode anything written on a surface of the celestial body.

In a general aspect, actions for explanatory information storage may include receiving, at a communications station and from a user device, an item to write on a surface of a celestial body that has less atmosphere than Earth, providing, by the communications station and to a robot on the surface of the celestial body, an instruction that triggers the robot to write the item on the surface of the celestial body, receiving, by the communications station and from the robot, an image of the item written on the surface of the celestial body, and providing, by the communications station and to the user device, the image of the item written on the surface of the celestial body.

Implementations of the above techniques include methods, systems and non-transitory machine-readable media. One such method performs the above-described actions. One such non-transitory machine-readable medium stores instructions that are executable by one or more processors and that, when executed, are configured to cause the one or more processors to perform the above-described actions. One such system includes a communications station which includes one or more processors and instructions stored in machine-readable media that, when executed by the one or more processors, are configured to cause the one or more processors to perform one or more of the above-described actions.

These and other embodiments can each optionally include one or more of the following features. In some aspects, providing an instruction that triggers the robot to write the item on the surface of the celestial body includes receiving, by the communications station and from the robot, an image of the surface of the celestial body before the item is written, determining, by the communications station, a location to write the item based on the image of the surface, and providing an instruction to the robot to write the item at the location that was determined by the communications station.

In certain aspects, receiving, by the communications station and from the robot, an image of the item written on the surface of the celestial body includes determining, by the communications station, a location from which an entirety of the item can be captured in an image that also includes a sky of the celestial body and instructing the robot to move to the location and capture the image of the item written on the surface of the celestial body. In some implementations, receiving, by the communications station and from the robot, an image of the item written on the surface of the celestial body is in response to providing the instruction that triggers the robot to write the item on the surface of the celestial body. In some aspects, the celestial body that has less atmosphere than Earth includes the Moon. In certain aspects, the communications station is located on Earth. In some implementations, the item is one or more of text or an image. In some aspects, the robot includes treads that are configured to print the item on the surface of the celestial body as the robot moves across the surface of the celestial body. In certain aspects, actions include storing an indication of the location the item that was written, receiving a request to provide a second image of the item, determining the location of the item from the indication that was stored, instructing the robot to go to the location and capture the second image of the item; and receiving the second image of the item.

The details of one or more disclosed implementations are set forth in the accompanying drawings and the description below. Other features, aspects, and advantages will become apparent from the description, the drawings and the claims.

BRIEF DESCRIPTION OF THE DRAWINGS

Like reference symbols in different figures indicate like elements.

DETAILED DESCRIPTION

Figure 1:
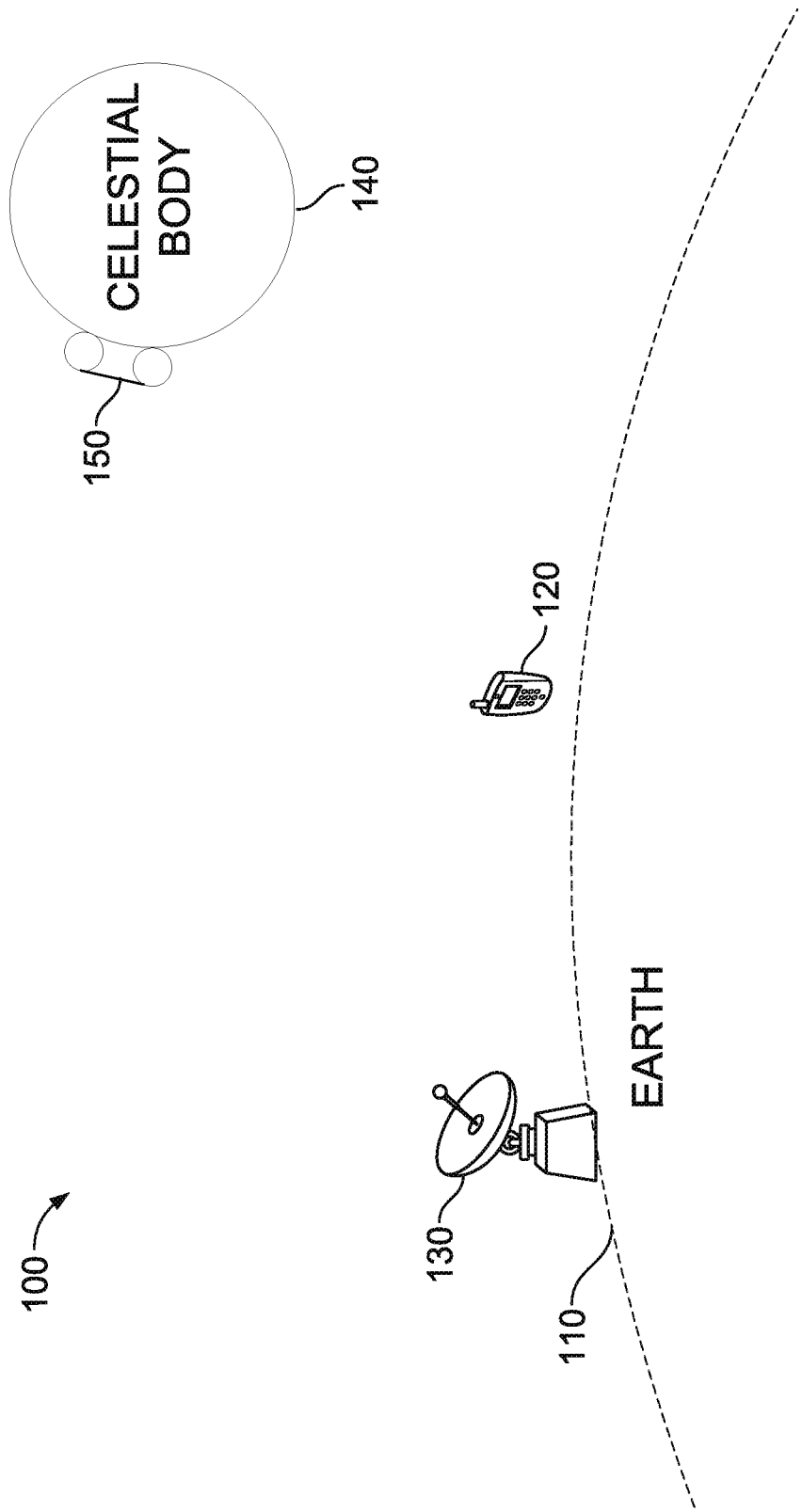
FIG. 1 illustrates an exemplary system for extraterrestrial information storage.

FIG. 1 illustrates an exemplary system 100 for extraterrestrial information storage. The system 100 includes a user device 120 on Earth 110, a communications station 130 on Earth 110, and a robot 150 on a surface of a celestial body 140 that has less atmosphere than Earth.

The user device 120 may be a computing device that may be used by a user to provide information to store on the celestial body 140 and receive an image that shows the information stored on the celestial body 140. For example, a user may type into the user device 120 the text "SAMPLE"

as an item to write on the surface of the Moon, the user device 120 may then transmit the text "SAMPLE" to the communications station 130, and the user device 120 may then receive an image of the text "SAMPLE" written on the surface of the Moon.

The user device 120 may be a mobile computing device, a laptop computer, a desktop computer, a tablet, or some other computing device. In response to receiving the image that shows the information stored on the celestial body 140, the user device 120 may display the image. For example, the user device 120 may receive the image of the text "SAMPLE" written on the surface of the Moon and then, without user input after receiving the image, display the image on the user device 120.

The communications station 130 may receive an item from the user device 120, provide the robot 150 an instruction that triggers the robot 150 to write the item on the surface of the celestial body, receive an image of the item written on the surface of the celestial body, and provide the image to the user device 120. For example, the communications station 130 may receive the text "SAMPLE" from the user device 120, provide the robot 150 an instruction that triggers the robot 150 to write the text "SAMPLE" on the surface of the Moon, receive an image of the text "SAMPLE" written on the surface of the Moon, and then provide the image to the user device 120.

In some implementations, the communications station 130 may determine where the robot 150 should write the item. For example, the communications station 130 may determine that the robot should write the text "SAMPLE" on a hill on the Moon. The communications station 130 may determine where the robot 150 should write the item based on an image from the robot 150. For example, the communications station 130 may determine that the robot 150 should write the text "SAMPLE" on the hill based on an image of the hill.

In some implementations, the communications station 130 may determine the location for the robot 150 to write the item based on performing visual object recognition in the image from the robot 150 to determine whether the item may be written on a surface of the celestial body shown in the image and whether an image may be captured by the robot 150 showing the entire item written and an extraterrestrial sky of the celestial body. For example, the communications station 130 may receive an image from the robot 150 of the hill and an extraterrestrial sky behind the hill, determine from the image that the text "SAMPLE" may be written by the robot 150 on a particular part of the hill, that the robot 150 can take an image of the text "SAMPLE" in its entirety after the text is written on the particular part of the hill and also have part of the extraterrestrial sky shown in the image, and, in response, determine the robot 150 should write the text "SAMPLE" on the particular part of the hill.

In another example, the communications station 130 may receive an image from the robot 150 of the hill and Earth behind the hill, determine from the image that the text "SAMPLE" may be written by the robot 150 on a particular part of the hill, that the robot 150 can take an image of the text "SAMPLE" in its entirety written on the particular part of the hill and also have Earth shown in the image, and, in response, determine the robot 150 should write the text "SAMPLE" on the particular part of the hill.

In some implementations, the communications station 130 may determine the location to write the item automatically without input from humans after the image of the surface of the celestial body 140 is received by the communications station 130. For example, the communications stations 130 may use visual object recognition to recognize a sky, ground, and slopes in the image. In some implementations, a human may instead view the image of the surface of the celestial body 140, decide the location to write the item from the image, then provide input to the communications station 130 that indicates the location, and the communications station 130 may then decide to write the item at the location indicated by the input from the user.

In some implementations, the communications station 130 may determine that the robot 150 should create an artificial hill on which to write an item and, in response, instruct the robot 150 to create the artificial hill, write the item on the artificial hill, and then capture an image of the item written on the artificial hill. For example, the communications station 130 may determine from an image from the robot 150 that it would be impossible for the robot 150 to write an item on any surface of the Moon shown in an image and take an image of the item written in its entirety and have the Earth in the background of the image with the item written and, in response, determine to instruct the robot 150 to create an artificial hill so that the item can be written on the artificial hill and an image captured with the item written and the Earth in the background.

In some implementations, the communications station 130 may determine the location for the robot 150 to write the item based on identifying a location not readily observable from space or Earth. For example, the communications station 130 may determine that an item includes sensitive or confidential information and, in response, determine to write the item in a location not readily observable from space or Earth.

In some implementations, after determining that an item includes sensitive or confidential information, the communications station 130 may attempt to identify, from an image from the robot 150, a natural covering, e.g., a cave, or a location not easily seen by telescopes or other long distance observation devices positioned on Earth (e.g., the dark side of the Moon). Additionally or alternatively, the communications station 130 may instruct the robot 150 to create an artificial covering and then write the item within the artificial covering. For example, the communications station 130 may determine that no natural covering is identifiable in an image from the robot 150 and, in response, instruct the robot 150 to dig a cave. Additionally or alternatively, in response to determining an item includes sensitive or confidential information, the communications station 130 may encrypt the item and then provide the encrypted item to the robot 150 to write.

Figure 2:
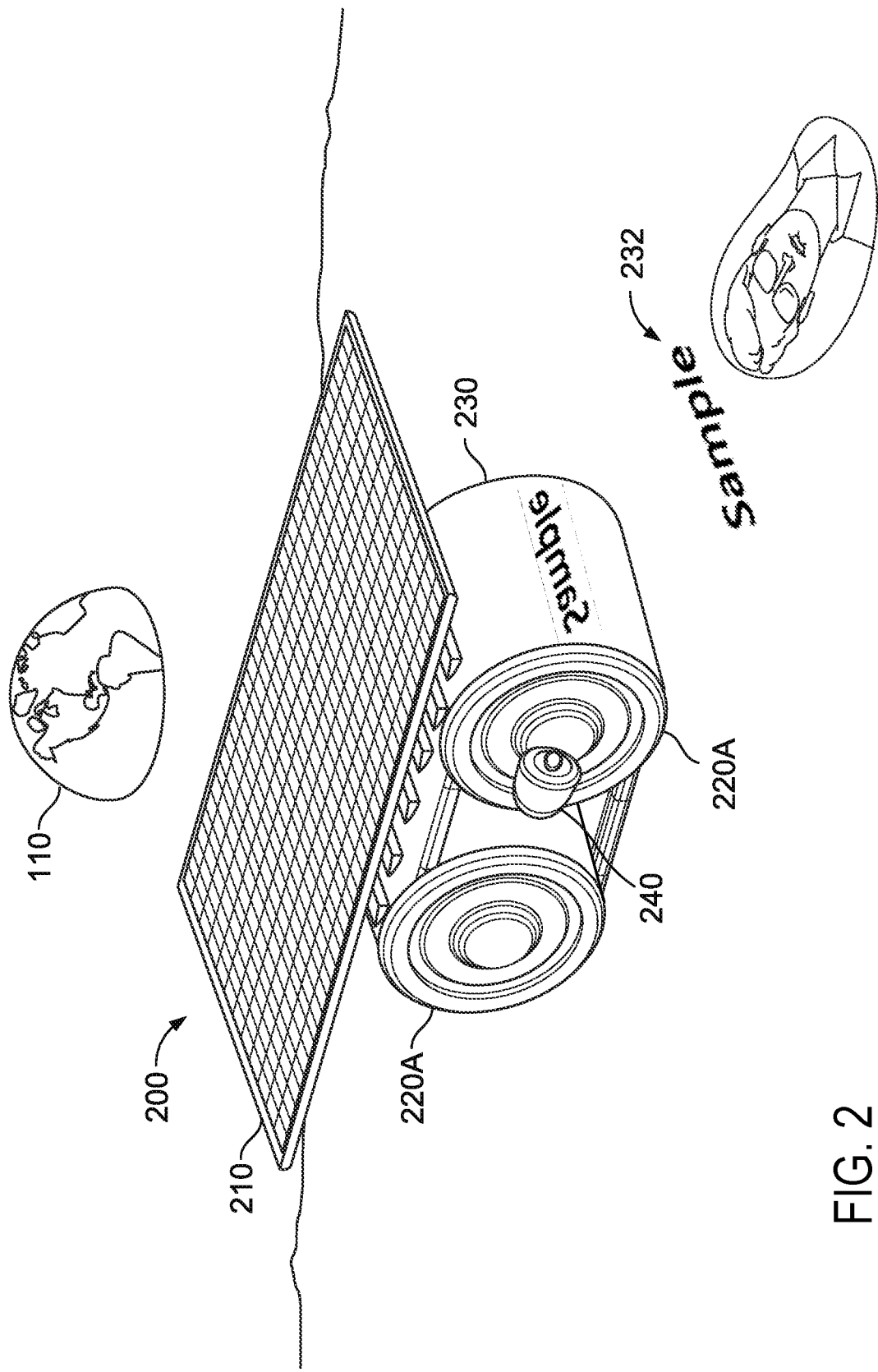
FIG. 2 illustrates an example of a robot for extraterrestrial information storage.

The robot 150 may be a electromechanical self-moving apparatus on the surface of the celestial body 140 and be configured to receive an item, write the item on the surface of the celestial body 140, capture an image of the item written on the surface of the celestial body 140, and provide the image of the item to the communications station 130. In some implementations, the image transmitted to the communications station 130 forms an acknowledgement of successful completion of storing information on the celestial body. FIG. 2 below describes more details of an example of robot 150.

In some implementations, the system 100 may include a radio-frequency communications apparatus that serves as a relay for communications between the communications station 130 and the robot 150. The communications station 130 may provide the robot 150 the instruction and receive the image of the item written on the surface of the celestial body through an intermediary radio-frequency communications apparatus on the celestial body 140.

For example, the communications station 130 may transmit an instruction to write the text "SAMPLE" to the radio-frequency communications apparatus on the celestial body 140, and the radio-frequency communications apparatus on the celestial body 140 may then relay the transmission to the robot 150. In the example, similarly, the robot 150 may transmit to the radio-frequency communications apparatus on the celestial body 140 an image of the text "SAMPLE" written on the celestial body 140, and the radio-frequency communications apparatus on the celestial body 140 may then relay the transmission to the communications station 130. In some implementations, the radio-frequency communications apparatus may be on the surface of the celestial body 140 or may be in space orbiting the celestial body 140, e.g., a satellite.

In some implementations, the system 100 may include multiple robots on the surface of the celestial body 140. For example, the system 100 may include two, ten, fifty, or some other number of robots. The robots may be communicably coupled to each other. For example, the robots may relay transmissions as a wireless mesh network.

In some implementations, the multiple robots may perform duplicative writing for redundancy purposes. Replicating an item in two or more distinct locations on the celestial body 140 may achieve a higher probability of survival over a given time period. In some implementations, the robot 150 may write duplicate copies in one or more additional locations after printing in a first location. In some implementations, the system 100 may include multiple communications stations that provide the robot 150 or a radio-frequency communications apparatus items to be written, and the robot 150 or a radio-frequency communications apparatus may queue up items to be written and decide an order that the items are to be written.

In some implementations, functionality of the communications station 130 described above may instead be performed by the robot 150 or a radio-frequency communications apparatus. For example, the robot 150 may decide where to write the item based on images captured by the robot 150 before the item is written. Accordingly, the robot 150 may not need to provide the communications station 130 an image for the communications station 130 to determine where the item should be written.

In some implementations, the communications station 130 may transmit instructions to the radio-frequency communications apparatus or the robot 150 so that the radio-frequency communications apparatus or the robot 150 may perform the functionality. For example, the communications station 130 may transmit instructions to the robot 150 that the robot 150 may execute to determine a location to write an item or execute to determine how to capture an image of an item that was written by the robot 150.

FIG. 2 illustrates an example of a robot 200 for extraterrestrial information storage. The robot 200 includes a solar panel 210, a set of wheels 220A and 220B (collectively referred to as 220), treads 230, and a camera 240. The robot 200 is an example of robot 150 shown in FIG. 1. However, robot 150 may be other types of robots. For example, the robot 150 may be a robot that includes multiple sets of treads 230. The solar panel 210 may be configured so that the robot 200 is self-powered on a celestial body.

The treads 230 may wrap around the set of wheels 220 such that the robot 200 may move through turning of the set of wheels 220. The treads 230 may be configured to have retractable portions such that the treads 230 may write items onto a surface of the celestial body. For example, the treads 230 may have retractable surfaces such that the weight of the robot 150 pressed onto the treads 230 generates dither type patterns or other similar techniques, e.g. small shallow hole or no hole in dirt, to write items on a surface of a celestial body. The retractable surfaces may function as print heads that may print circular, square, or some other shaped holes on a surface of the celestial body.

As shown in FIG. 2, portions of the tread 230 have been retracted to form the text "SAMPLE" and the text "SAMPLE" 232 has been written on the surface of the celestial body as well as a representation of a face. In some implementations, instead of writing with the treads 230, the robot 200 may include a chisel and write with the chisel. For example, the robot 200 may include a moveable arm with a chisel at the end of the moveable arm where the robot 200 is configured to write items using the chisel.

The camera 240 may be configured to capture images of a surface of the celestial body. For example, the camera 240 may be attached to the wheel 220A close to a surface so that the camera 240 may capture an image of the entire text "SAMPLE" written on the surface of a celestial body and include a sky of the celestial body.

Figure 3:
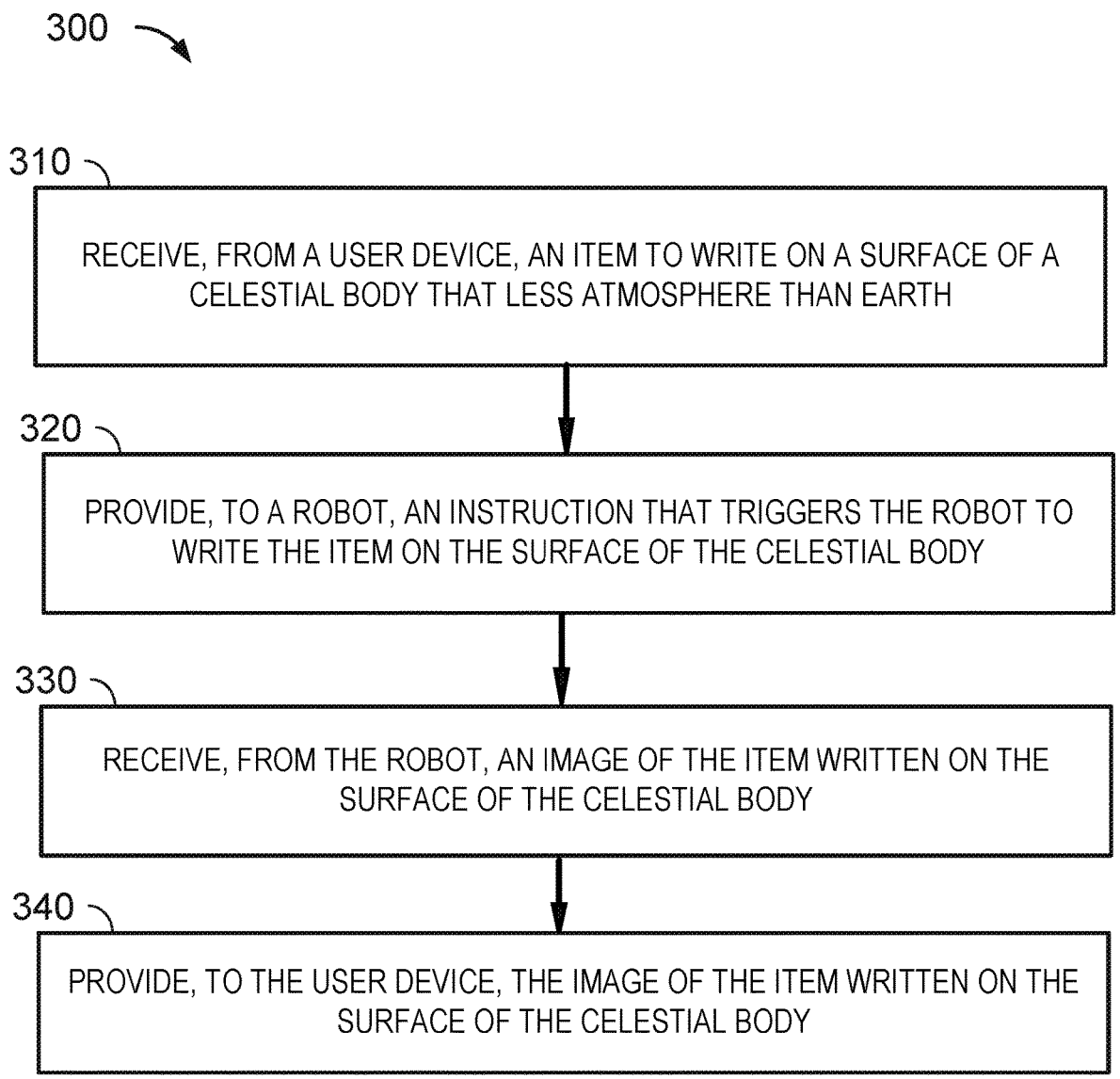
FIG. 3 illustrates an example of a process for extraterrestrial information storage.

FIG. 3 illustrates an example of a process 300 for extraterrestrial information storage. In some implementations, the process 300 is performed by the communications station 130 of FIG. 1.

The process 300 includes receiving an item to write on a surface of a celestial body that has less atmosphere than Earth (310). For example, the communications station 130 may receive an image of a face from the user device 120. In some implementations, the celestial body that has less atmosphere than Earth is the Moon. In some implementations, the communications station is located on Earth. For example, the communications station 130 is located on Earth. In some implementations, the item is one or more of text or an image. For example, the item may be an image of a person's face, the text "SAMPLE," or a combination of both.

The process 300 includes providing, to a robot, an instruction that triggers the robot to write the item on the surface of the celestial body (320). For example, the communications station 130 may use an antenna to wirelessly transmit an instruction that includes a representation of the person's face and an indication of "Write" to the robot 150, directly or through a communications apparatus orbiting or on the celestial body 140.

In some implementations, providing an instruction that triggers the robot to write the item on the surface of the celestial body includes receiving, by the communications station and from the robot, an image of the surface of the celestial body before the item is written, determining, by the communications station, a location to write the item based on the image of the surface, and providing an instruction to the robot to write the item at the location that was determined by the communications station.

For example, the communications station 130 may receive an image captured by the robot 150 before the person's face is written where the image includes a single hill with the Earth in the background, identify the hill and Earth in the image through visual object recognition, determine that based on the identification of the hill and Earth that the person's face may be written on the hill and that an image can be captured of the entire person's face written on the hill and with Earth in the background, and, in response, provide an instruction to the robot 150 to write the person's face on the hill.

In some implementations, the robot includes treads that are configured to print the item on the surface of the celestial body as the robot moves across the surface of the celestial body. For example, the robot 200 includes treads 230 where portions of the treads 230 may be retracted to form a representation of a person's face.

The process 300 includes receiving, from the robot, an image of the item written on the surface of the celestial body (330). For example, the communications station 130 may receive, from the robot 150, an image of the person's face printed on a hill with the Earth in the background of the image.

In some implementations, receiving, by the communications station and from the robot, an image of the item written on the surface of the celestial body includes determining, by the communications station, a location from which an entirety of the item can be captured in an image that also includes a sky of the celestial body and instructing the robot to move to the location and capture the image of the item written on the surface of the celestial body. For example, the communications station 130 may determine, from an image from the robot 150 captured before the item is written at a location, that an entirety of the item after being written may be captured in an image with the Earth in the background and instruct the robot 150 to go the location after the robot 150 writes the item and capture an image.

In some implementations, receiving, by the communications station and from the robot, an image of the item written on the surface of the celestial body is in response to providing the instruction that triggers the robot to write the item on the surface of the celestial body. For example, the communications station 130 may provide the instruction to write a representation of the person's face onto the Moon and, without transmitting any further instructions to that instruction, receive an image of the representation of the person's face written on the surface.

The process 300 includes providing, to the user device, the image of the item written on the surface of the celestial body (340). For example, the communications station 130 may transmit the image from the robot 150 to the user device 120.

In some implementations, the process 300 includes storing an indication of the location the item that was written, receiving a request to provide a second image of the item, determining the location of the item from the indication that was stored, instructing the robot to go to the location and capture the second image of the item, and receiving the second image of the item. For example, the communications station 130 may store data that indicates that a representation of a person's face was written on a particular hill, later, receive a request to provide another image of the representation of the person's face, in response to the request, determine from the stored data that the item was written on the hill, in response, instruct the robot to go to the hill and capture the other image of the representation of the person's face, and then receive from the robot 150 the other image.

The disclosed and other examples can be implemented as one or more computer program products, i.e., one or more modules of computer program instructions encoded on a computer readable medium for execution by, or to control the operation of, data processing apparatus. The implementations can include single or distributed processing of algorithms. The computer readable medium can be a machine-readable storage device, a machine-readable storage substrate, a memory device, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A system may encompass all apparatus, devices, and machines for processing data, including by way of example a programmable processor, a computer, or multiple processors or computers. A system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed for execution on one computer or on multiple computers that are located at one site or distributed across multiple sites and interconnected by a communications network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer can include a processor for performing instructions and one or more memory devices for storing instructions and data. Generally, a computer can also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data can include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document may describe many specifics, these should not be construed as limitations on the scope of an invention that is claimed or of what may be claimed, but rather as descriptions of features specific to particular embodiments. For example, a communications channel may include the Web, where a user may interact with an interaction site via a webpage generated dynamically according to the interaction flow. As another example, a communications channel may include a smart phone application, where a user may interact with an interaction site by starting a smart phone application, and the smart phone application then contacts the interaction site and provides a communications interface between the user and the interaction site. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination in some cases can be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method comprising:
receiving, at a communications station from a user device distinct from the communications station and that is communicably coupled to the communications station, data corresponding to content to generate on a surface of an extraterrestrial object;
determining, by the communications station, a target location on the surface of the extraterrestrial object for generating the content;
providing, by the communications station to an electronic device of one or more electronic devices on the surface of the extraterrestrial object, an instruction to generate the content at the target location on the surface of the extraterrestrial object;
receiving, by the communications station from the electronic device, an indication of the content having been generated at the target location on the surface of the extraterrestrial object; and
providing, by the communications station to the user device, confirmation that the content has been generated on the surface of the extraterrestrial object.

2. The method of claim 1, further comprising:
determining, by the communications station, a second target location on the surface of the extraterrestrial object for generating the content; and
providing, by the communications station to the electronic device following generating the content at the target location, a second instruction to generate the content at the second target location on the surface of the extraterrestrial object.

3. The method of claim 1, further comprising:
determining, by the communications station, a second target location on the surface of the extraterrestrial object for generating the content;
providing, by the communications station to a second electronic device of the one or more electronic devices on the surface of the extraterrestrial object, a second instruction to generate the content at the second target location on the surface of the extraterrestrial object; and
receiving, by the communications station from the second electronic device, a second indication of the content having been generated at the second target location on the surface of the extraterrestrial object.

4. A method comprising:
receiving, at an electronic device from a user device that is communicably coupled to the electronic device, data corresponding to content to generate on a surface of an extraterrestrial object;
in response to receiving the data corresponding to content to generate on the surface of the extraterrestrial object, determining, by the electronic device, a target location on the surface of the extraterrestrial object for generating the content;
generating, by the electronic device using one or more instruments coupled to the electronic device, the content at the target location on the surface of the extraterrestrial object; and
providing, by the electronic device to the user device, confirmation that the content has been generated on the surface of the extraterrestrial object.

5. The method of claim 4, wherein the electronic device is positioned on the surface of the extraterrestrial object, and wherein receiving the data at the electronic device from the user device comprises:
receiving, from a second electronic device, the data corresponding to the content to generate on the surface of the extraterrestrial object, the second electronic device communicably coupled to the user device and relaying the data from the user device to the electronic device.

6. The method of claim 5, wherein providing, by the electronic device to the user device, confirmation that the content has been generated on the surface of the extraterrestrial object comprises providing an indication to the second electronic device of the content having been generated at the target location on the surface of the extraterrestrial object, the method further comprising:
providing, by the second electronic device to the user device, confirmation that the content has been generated on the surface of the extraterrestrial object.

7. The method of claim 5, wherein the second electronic device is positioned on the surface of the extraterrestrial object, the method further comprising:
generating, by the second electronic device, the content at a second target location on the surface of the extraterrestrial object.

8. A system comprising:
a communications station;
one or more electronic devices on a surface of an extraterrestrial object that are communicably coupled to the communications station; and
one or more computer-readable media storing instructions that, when executed, are configured to cause one or more processors to perform operations comprising:
receiving, at the communications station from a user device distinct from the communications station and that is communicably coupled to the communications station, data corresponding to content to generate on the surface of the extraterrestrial object;
determining, by the communications station, a target location on the surface of the extraterrestrial object for generating the content;
providing, by the communications station to an electronic device of the one or more electronic devices, an instruction to generate the content at the target location on the surface of the extraterrestrial object;

receiving, by the communications station from the electronic device, an indication of the content having been generated at the target location on the surface of the extraterrestrial object; and providing, by the communications station to the user device, confirmation that the content has been generated on the surface of the extraterrestrial object.

9. The system of claim 8, wherein the operations further comprise:

determining, by the communications station, a second target location on the surface of the extraterrestrial object for generating the content; and providing, by the communications station to the electronic device following generating the content at the target location, a second instruction to generate the content at the second target location on the surface of the extraterrestrial object.

10. The system of claim 8, wherein the operations further comprise:

determining, by the communications station, a second target location on the surface of the extraterrestrial object for generating the content;

providing, by the communications station to a second electronic device of the one or more electronic devices, a second instruction to generate the content at the second target location on the surface of the extraterrestrial object; and receiving, by the communications station from the second electronic device, a second indication of the content having been generated at the second target location on the surface of the extraterrestrial object.

11. A system comprising:

one or more electronic devices on a surface of an extraterrestrial object; and one or more computer-readable media storing instructions that, when executed, are configured to cause one or more processors to perform operations comprising:

receiving, at an electronic device of the one or more electronic devices and from a user device that is communicably coupled to the electronic device, data corresponding to content to generate on the surface of the extraterrestrial object;

in response to receiving the data corresponding to content to generate on the surface of the extraterrestrial object, determining, by the electronic device, a target location on the surface of the extraterrestrial object for generating the content;

generating, by the electronic device using one or more instruments coupled to the electronic device, the content at the target location on the surface of the extraterrestrial object; and providing, by the electronic device to the user device, confirmation that the content has been generated on the surface of the extraterrestrial object.

12. The system of claim 11, wherein the electronic device is positioned on the surface of the extraterrestrial object, and wherein receiving the data at the electronic device from the user device comprises:

receiving, from a second electronic device, the data corresponding to the content to generate on the surface of the extraterrestrial object, the second electronic device communicably coupled to the user device and relaying the data from the user device to the electronic device.

13. The system of claim 12, wherein providing, by the electronic device to the user device, confirmation that the content has been generated on the surface of the extraterrestrial object comprises providing an indication to the second electronic device of the content having been generated at the target location on the surface of the extraterrestrial object, wherein the operations further comprise:

providing, by the second electronic device to the user device, confirmation that the content has been generated on the surface of the extraterrestrial object.

14. The system of claim 12, wherein the second electronic device is positioned on the surface of the extraterrestrial object, wherein the operations further comprise:

generating, by the second electronic device, the content at a second target location on the surface of the extraterrestrial object.

15. One or more non-transitory computer-readable media storing instructions that, when executed, are configured to cause one or more processors to perform operations comprising:

receiving, at a communications station from a user device distinct from the communications station and that is communicably coupled to the communications station, data corresponding to content to generate on a surface of an extraterrestrial object;

determining, by the communications station, a target location on the surface of the extraterrestrial object for generating the content;

providing, by the communications station to an electronic device of one or more electronic devices on the surface of the extraterrestrial object, an instruction to generate the content at the target location on the surface of the extraterrestrial object;

receiving, by the communications station from the electronic device, an indication of the content having been generated at the target location on the surface of the extraterrestrial object; and providing, by the communications station to the user device, confirmation that the content has been generated on the surface of the extraterrestrial object.

16. The one or more non-transitory computer-readable media of claim 15, wherein the operations further comprise:

determining, by the communications station, a second target location on the surface of the extraterrestrial object for generating the content; and providing, by the communications station to the electronic device following generating the content at the target location, a second instruction to generate the content at the second target location on the surface of the extraterrestrial object.

17. The one or more non-transitory computer-readable media of claim 15, wherein the operations further comprise:

determining, by the communications station, a second target location on the surface of the extraterrestrial object for generating the content;

providing, by the communications station to a second electronic device of the one or more electronic devices, a second instruction to generate the content at the second target location on the surface of the extraterrestrial object; and receiving, by the communications station from the second electronic device, a second indication of the content having been generated at the second target location on the surface of the extraterrestrial object.

18. One or more non-transitory computer-readable media storing instructions that, when executed, are configured to cause one or more processors to perform operations comprising:
- receiving, at an electronic device of one or more electronic devices on a surface of an extraterrestrial object and from a user device that is communicably coupled to the electronic device, data corresponding to content to generate on the surface of the extraterrestrial object;
- in response to receiving the data corresponding to content to generate on the surface of the extraterrestrial object, determining, by the electronic device, a target location on the surface of the extraterrestrial object for generating the content;
- generating, by the electronic device using one or more instruments coupled to the electronic device, the content at the target location on the surface of the extraterrestrial object; and
- providing, by the electronic device to the user device, confirmation that the content has been generated on the surface of the extraterrestrial object.

19. The one or more non-transitory computer-readable media of claim 18, wherein the electronic device is positioned on the surface of the extraterrestrial object, and wherein receiving the data at the electronic device from the user device comprises:
- receiving, from a second electronic device, the data corresponding to the content to generate on the surface of the extraterrestrial object, the second electronic device communicably coupled to the user device and relaying the data from the user device to the electronic device.

20. The one or more non-transitory computer-readable media of claim 19, wherein providing, by the electronic device to the user device, confirmation that the content has been generated on the surface of the extraterrestrial object comprises providing an indication to the second electronic device of the content having been generated at the target location on the surface of the extraterrestrial object, wherein the operations further comprise:
- providing, by the second electronic device to the user device, confirmation that the content has been generated on the surface of the extraterrestrial object.

21. The one or more non-transitory computer-readable media of claim 19, wherein the second electronic device is positioned on the surface of the extraterrestrial object, wherein the operations further comprise:
- generating, by the second electronic device, the content at a second target location on the surface of the extraterrestrial object.

* * * * *